US010274603B2

United States Patent
Kurby et al.

(10) Patent No.: US 10,274,603 B2
(45) Date of Patent: Apr. 30, 2019

(54) GPS HOLDOVER WITH SELECTED BIT PREDICTION OR OMISSION

(71) Applicant: iPosi, Inc., Denver, CO (US)

(72) Inventors: Christopher Neil Kurby, Streamwood, IL (US); Eric Derbez, Vancouver (CA)

(73) Assignee: iPosi, Inc., Denver, CO (US)

(*) Notice: Subject to any disclaimer, the term of this patent is extended or adjusted under 35 U.S.C. 154(b) by 0 days.

(21) Appl. No.: 15/977,761

(22) Filed: May 11, 2018

(65) Prior Publication Data

US 2018/0329071 A1 Nov. 15, 2018

Related U.S. Application Data

(60) Provisional application No. 62/505,579, filed on May 12, 2017.

(51) Int. Cl.
| | | |
|---|---|---|
| *G01S 19/26* | (2010.01) | |
| *G01S 19/25* | (2010.01) | |
| *H04B 1/7075* | (2011.01) | |
| *G01S 19/30* | (2010.01) | |
| *H04B 1/7073* | (2011.01) | |

(52) U.S. Cl.
CPC .............. *G01S 19/26* (2013.01); *G01S 19/25* (2013.01); *G01S 19/30* (2013.01); *H04B 1/7075* (2013.01); *H04B 1/70735* (2013.01)

(58) Field of Classification Search
CPC .......... G01S 19/26; G01S 19/25; G01S 19/30; H04B 1/70735; H04B 1/7075
USPC ......................................................... 342/352
See application file for complete search history.

(56) References Cited

U.S. PATENT DOCUMENTS

| | | | | |
|---|---|---|---|---|
| 2006/0290566 A1* | 12/2006 | Syrjarinne | .............. | G01S 19/06 342/357.43 |
| 2014/0347218 A1* | 11/2014 | Gao | ........................ | G01S 19/24 342/357.63 |

* cited by examiner

*Primary Examiner* — Harry K Liu
(74) *Attorney, Agent, or Firm* — Marsh Fischmann & Breyfogle LLP

(57) ABSTRACT

The present disclosure is directed to utilities (methods, systems, apparatuses) associated with improving the signal-to-noise ratio of a wireless signal at a receiver. It is known in the art to correlate a received signal with a replica signal generated at the receiver to improve reception. However, the inventors have determined that correlation using a replica signal which is not completely accurate may be detrimental. An improved method of correlation disclosed herein includes identifying data bits which are predictable and performing correlation with respect to those data bits while ignoring data bits which are identified as unpredictable. This method may have particular advantages in the case of receivers having attenuated reception (e.g., indoors) after losing a data connection used for receipt of assistance data.

15 Claims, 9 Drawing Sheets

GPS HOLDOVER WITH SELECTED BIT PREDICTION OR OMISSION

RELATED APPLICATIONS

This application is a non-provisional of U.S. Application No. 62/505,579 entitled "GPS HOLDOVER WITH SELECTED BIT PREDICTION OR OMISSION," which was filed on May 12, 2017, the entirety of which is incorporated by reference herein.

TECHNICAL FIELD

This disclosure generally relates to global navigation by satellite systems. More specifically, it relates to improved acquisition and retention of PNT signals at a receiver having attenuated reception, such as may be the case with an indoor receiver.

GLOSSARY

AGNSS assisted GNSS
AGPS assisted GPS
C/A coarse acquisition code
CI coherent integration
dB decibel
GNSS global navigation by satellite system
GPS Global Position System
MHz megahertz
m meter
ms milliseconds
μs microseconds
NCI non coherent integration
ns nanosecond
PNT position, navigation, or timing
ppb parts per billion
PRN pseudo-random noise
RF radio frequency
SNR signal to noise ratio
SV satellite vehicle
TCXO Temperature compensated crystal oscillator

BACKGROUND

In order for a GNSS receiver to calculate its position in relation to visible satellite vehicles, it must first receive information regarding how to interpret the PNT signals it receives from those satellites. This information is contained in navigation messages (conveyed as data bits) and may include: where satellite vehicles are currently/will be located (e.g., ephemeris or almanac data), current and predicted atmospheric conditions, satellite health, etc. A navigation message is typically embedded within PNT signals (i.e., modulated into the C/A code) and repeats in a cyclical manner. The information within the navigation message may receive periodic updates from a control segment which represent up-to-date conditions and observations. Typically, successive navigation messages are identical until such time that an update occurs.

When a receiver "cold-starts" (meaning, it begins attempting to acquire signals without any previously received navigation message data) it must initially "listen" to PNT signals from visible satellites to extract a navigation message. The navigation message will provide the receiver with information that will allow it to "lock-on" to the PNT signals. Only after locking on to the PNT signals is a receiver able to calculate its location and current time. In the case of an outdoor receiver, this process is routine. However, indoor receivers (for time-keeping, emergency services, etc.) may be unable to perceive the PNT signals with enough clarity to extract a navigation message. In other words, the strength of a radio signal may be too attenuated in an indoor environment for the receiver to comprehend a navigation message in the PNT signal due to insufficient sensitivity of the receiver. Without the navigation message, a receiver will likely be unable to acquire any satellite signals and will not function properly. Therefore, some receivers (e.g., assisted GNSS) acquire navigation messages through alternative channels to ensure the receiver has access to the information.

Some AGNSS receivers maintain a connection to a data network for reception of assistance data which includes navigation messages. For example, a receiver may have an internet connection, a mobile data network (e.g., 4G) antenna, etc. through which it receives navigation messages. A receiver may utilize this information in the generation of a replica signal which it then uses to assess correlation with regard to a received PNT signal in order to perform calculations such as, for example, a pseudo-range to a satellite vehicle which is in turn used to calculate time and position. Theoretically, given that an assisted receiver knows the navigation message data that will be embedded in the C/A signal, the replica signal should be identical to the signal transmitted from the respective satellite vehicle and correlation should be accurate. However, in the absence of assistance data (e.g., due to a network outage), the replica signal is likely to contain errors because certain bits of information may have been updated in a more recent navigation message while the information on the receiver remains outdated. Therefore, in the event that a receiver's data connection is lost, it may "lose" a PNT signal as a result of correlation degradation. In this regard, a solution is needed to address the problem of receivers dropping signals when assistance data cannot be received through alternative channels.

SUMMARY

In view of the foregoing, it is presently recognized that, in accordance with an embodiment of the present invention and in response to losing access to assistance data, a receiver may analyze a previously received navigation message and apply the data therein to reduce PNT signal correlation degradation.

An exemplary process may include determining which bits of the previously received navigation message data: will remain static for some period of time; are calculable based on elapsed time (e.g., some data changes linearly at a known rate); or are unpredictable and should be disregarded (it should be noted that for convenience, the terms "data bit" and "bit" as used throughout this disclosure may be interchangeable and may refer to a data bit, a parity bit, etc.). While performing signal integration on C/A code from a received PNT signal, a receiver may ignore C/A code epochs modulated with unknown and unpredictable navigation message data bits and/or predict certain other navigation data bits in order to correctly construct replica C/A code and thereby reduce correlation degradation resulting from a loss of assistance data. In this regard, a receiver may stop the C/A code integration process during receipt of an unpredictable navigation message data bit and resume the integration process upon receipt of a predictable bit.

In regard to the present invention, is important to note the distinction and relationship between a navigation message data bit and a C/A (pseudorandom number or PRN) bit or "chip." Navigation messages ("navigation signal data") are modulated into a transmitter's C/A code (e.g., the PRN code) which is in turn modulated into the carrier frequency, as illustrated in FIG. 1. Notably, the two signal codes have different bit rates causing bit transitions (depicted as vertical lines in FIG. 1) to typically not be aligned with one another. Specifically, PNT signals transmit navigation message data bits at 50 bps (a 20 ms bit length), thereby requiring about 12.5 minutes to transmit all 25 pages of a navigation message, that is almanac, ephemeris, timing, and other data. A transmitter's C/A code is typically transmitted at a rate of approximately 1.023 Mbps (i.e., 0.9775 µs bit or chip length) and repeats the 1,023 chip sequence every 1 ms.

Upon receiving a PNT signal, a receiver may demodulate or separate the C/A code and the navigation message code from the signal. The C/A code may be correlated to the replica signal for calculations regarding position, navigation, and time. In the event that incorrect data has been incorporated into the replica signal (e.g., from an outdated navigation message), the correlation will be poor because chips with positive polarity in the PNT signal may be aligned with chips with negative polarity in the replica signal during integration. The discrepancy may cause the receiver to construct an integrated signal which does not accurately depict the C/A code because incorrect polarity may result in subtracting from an integration value rather than adding to it.

The disclosed technique of pausing integration during receipt of unpredictable (and therefore likely incorrect) data bits, or simply ignoring C/A code epochs associated with the unpredictable data bits, improves correlation. Typically, it is assumed that more data being included in signal integration will yield an improved SNR. However, empirical evidence (discussed below in relation to the present invention) indicates that without assistance data the inclusion of unpredictable navigation message data bits in signal integration is detrimental to retaining the signal. Instead, disregarding unpredictable data bits was found to provide a higher SNR which improves signal correlation by ensuring successive epochs of C/A code being summed for integration are, for all intents and purposes, the same.

Although applicable to both indoor and outdoor GNSS receivers, aspects of the disclosed invention may be particularly applicable to indoor GNSS receivers. This is because indoor antennas generally receive a less direct, more attenuated PNT signal. Indoor receivers often must repetitively integrate successive C/A epochs in order to produce enough signal gain to comprehend PNT signals. For more information on indoor signal acquisition/tracking see, for example, U.S. Pat. No. 7,961,717 to Lee entitled "SYSTEM AND METHODS FOR IP AND VOW DEVICE LOCATION DETERMINATION" which is incorporated herein by reference in its entirety. It should be noted that the utilities described herein may be applied during coherent integration, non-coherent integration, or both.

In assisted systems, navigation messages may be transmitted to a receiver through the internet or another data source. In the absence of receiving assistance data, signal correlation may degrade until it fails. This occurs, at least in part, as a result of outdated navigation message data bits, which no longer accurately replicate the PNT signals, being included in the integration process. When this happens, the time maintained by the receiver, which would otherwise be repeatedly calibrated according to the PNT signals, may be switched into a holdover mode wherein the clock continues operating from the time most recently calculated before the correlation degraded. This is only a temporary solution, however, because many GNSS receivers do not have high-stability oscillators and therefore a receiver's clock time will drift away from absolute time until signal correlation fails. A TCXO may have a stability of 100 ppb over 24 hours, for example, such that the receiver's time will degrade at this rate until at some point it will no longer meet the required time specifications and correlation will break down.

In accordance with the present invention, some data bits may be predicted by the receiver based on a previously received navigation message so that C/A epochs may be properly integrated even after a data connection has been lost. In this regard, most of the information contained in navigation messages changes slowly over time and, therefore, some of the 37,500 data bits in a navigation message can be predicted based upon bits contained in a previously received navigation message. For example, the time of week for a given navigation message may be predicted based upon the time of week from a previous navigation message received prior to loss of the data connection plus the time elapsed since reception of the previous message as determined by calculations associated with the local oscillator. In this regard, within a certain window of time following the loss of the data connection, the oscillator may be sufficiently accurate to allow the receiver to rely upon its calculations and to predict certain navigation message data bits.

Depending on oscillator stability, predictable bits may be useful for an extended period of time. A receiver may determine that certain bits are predictable for a given period of time terminating when those bits are scheduled to be changed by the control segment (e.g., new almanac uploaded). These bits can be predicted until the period of time has elapsed and the value of the bit has expired. During the period of validity of a predictable bit, a predicted value may be substituted in place of an actual value, which is no longer accessible from the network, during correlation of the C/A code. However, in order to reduce correlation degradation following the expiration of the data contained in predictable bits (e.g., after an update by the control segment), the C/A code epochs corresponding to expired predictable bits may be considered unpredictable and all unpredictable data bits may be ignored during integration. This method may allow a receiver to continue integrating successively received epochs of C/A code corresponding to known polarities of predictable bits without introducing erroneous polarities associated with unknown and unpredictable bits.

Due to the accuracy of typical receiver oscillators, drift may limit the practical applicability of the above described methods to, for example, one day or less. However, as an alternative, the pilot (codeless) channel on L5 may be used. Because there are no data bits in the L5 pilot channel to integrate over, no assistance data is necessary to construct replica code once the pilot signal is stored on the receiver. In other words, the L5 pilot code does not change and may therefore be useful for signal correlation for an extended period of time.

Notably, reliable models for satellite clock corrections and ephemeris may be needed by the receiver to maintain accuracy. Block IIR satellites, as an example, are believed to facilitate such functionality and at some point in time there will be enough Block IIR satellites to have two or more satellites (between Galileo and GPS) overhead at any given time. If predicted satellite clock and ephemeris information (valid for two to four weeks, for example) are uploaded every day to a stationary receiver, such receiver could use the L5 pilot channel to recover time for as long as the accuracy of these predictions can be trusted. The accuracy of some satellite clocks is believed to be approximately 0.5 µs over a two week period with a quadratic drift. In this regard, practical application of L5 pilot signal to the methods described herein may be limited to approximately one week. Further, if four or more L5 (or any codeless ranging signals) were receivable then the L5 pilot signal could be used for a moving receiver.

Outlier events that may require adjustments at the receiver include instances when a satellite vehicle performs a momentum dump or otherwise fires a booster to adjust trajectory and also the slewing of clock corrections. The latter occurs when a satellite clock drifts beyond its specified error range and the satellite "swallows" or omits a chip in its code to adjust for this event.

A method of the present disclosure is for continued tracking of a broadcast positioning system signal upon loss of connectivity to assistance data regarding the broadcast positioning system signal. The method may include determining a loss of connectivity to assistance data regarding a broadcast positioning system signal at a receiver. In this regard, assistance data which is normally accessible may become unavailable. The method may further include receiving, at the receiver, the broadcast positioning system signal comprising encoded data bits. The encoded data bits may include predictable bits and unpredictable bits. The encoded data bits may be predictable or unpredictable based upon a structure of the encoded data bits defined in positioning system signal information available in the absence of connectivity to the assistance data. In this regard, a standard formatting, organization, layout, or other structure may be common to messages in the broadcast positioning system signal such that certain information is consistently provided in known locations in the structure. The method may further include integrating the encoded data bits over an integration period. The unpredictable bits of the encoded data bits may not be summed in the integrating and the predictable bits of the encoded data bits may be summed in the integrating. By ignoring the unpredictable bits during integration, correlation degradation may be reduced as compared to known methods.

The broadcast positioning system signal may originate from a global navigation by satellite system and may include a coarse acquisition code and a navigation message code comprising a plurality of navigation messages. The assistance data may include a plurality of duplicate navigation messages, each duplicate navigation message simulating a corresponding navigation message of the navigation message code.

In an aspect, the structure of the encoded data bits may include an architecture common to each navigation message. Such an architecture may include a plurality of pages, each page comprising a plurality of subframes, each subframe comprising a plurality of words, and each word comprising a plurality of data bits. Values of predictable bits may be predictable based upon positions of the predictable bits within the architecture.

The predictable bits may include a telemetry word and a handover word of the navigation message code and may further include at least one of almanac information and ephemeris information pertaining to satellite vehicles. In an embodiment, the unpredictable bits may include ephemeris information updated by a control segment to at least one satellite vehicle of the global navigation by satellite system subsequent to receipt of assistance data comprising a first duplicate navigation message at the receiver via a data network connection. The first duplicate navigation message may identify values of data bits in a first navigation message of the broadcast positioning system signal.

The positioning system signal information used to define the structure of the data bits may include the first duplicate navigation message received at the receiver prior to the loss of connectivity to the assistance data.

The coarse acquisition code may include a first encoded data sequence at a first encoded data rate (e.g., the rate at which the bit in the first encoded data sequence changes) corresponding to a first bit length and the navigation message code may include a second encoded data rate corresponding to a second bit length. The first encoded data rate may be higher than the second encoded data rate such that the first bit length is shorter than the second bit length. The navigation message code may modulate the coarse acquisition code. A duration of the integration period may be greater than the second bit length and the unpredictable bits may include known bit values of the coarse acquisition code modulated by unknown bits of the navigation message code, whereas the predictable bits may include known bit values of the coarse acquisition code modulated by known bits of the navigation message code.

In an aspect, a method of the present disclosure may further include predicting values of data bits to be received in a second navigation message subsequent to the loss of connectivity to the assistance data. The predicting may be based at least in part on the first duplicate navigation message. The method may also include demodulating (e.g., subtracting or removing the data bits), at the receiver, first portions of the second navigation message which includes the predictable bits, coherently integrating the first portions, and placing the receiver into a holdover mode during at least one of receipt and processing of second portions of the second navigation message comprising the unpredictable bits. The holdover mode may include maintaining a time according to a local clock at the receiver utilizing an oscillator associated with the local clock without electrically steering a frequency of the oscillator.

In an aspect, the predicting may include extracting, from the first duplicate navigation message, known values of data bits which are expected to remain unchanged in subsequent navigation messages including at least the second navigation message; extracting, from the first duplicate navigation message, known values of data bits which are expected to change in accordance with absolute time such that corresponding data bits in the second navigation message are predictable based upon time and the known values of the data bits of the first duplicate navigation message; and predicting a value of at least one data bit to be received from the global navigation by satellite system in the second navigation message based upon a known time and a value of a corresponding data bit observed in the first duplicate navigation message.

In some embodiments, the broadcast positioning system signal may be a pilot signal of the GPS L5 band and the assistance data may include a sequence of bit values repeated in the pilot signal. Regardless of the signal type, the receiver may be stationary and disposed in a location susceptible to attenuated signal strength such that the disclosed features are useful for continuing to track the signal without access to assistance data.

An apparatus in accordance with the present disclosure may be utilized in various capacities for performing one or more of the steps recited above, in addition to providing further functionality. The apparatus may include a network adapter, a receiver, a bit predictor, and an integration module. The network adapter may provide the apparatus with access to assistance data available via a network connection, for example, an Ethernet, WiFi, or cellular connection to the internet. The receiver may be operative to receive a broadcast positioning system signal, via an antenna, which includes encoded data bits. The bit predictor may be operative to determine which of the encoded data bits are predictable and predict a phase of each of the predictable bits. The integration module may be operative to integrate the encoded data bits over an integration period.

The bit predictor may also be operative to predict values of data bits to be received in a second navigation message subsequent to the loss of connectivity to the assistance data based at least in part on the first duplicate navigation message. The receiver may be further operative to demodulate first portions of the second navigation message comprising the predictable bits, coherently integrate the first portions, and initiate a holdover mode during at least one of receipt and processing of second portions of the second navigation message comprising the unpredictable bits.

The apparatus may also include a local clock. In this regard, the holdover mode include maintaining a time according to the local clock utilizing an oscillator associated with the local clock without electrically steering a frequency of the oscillator.

DETAILED DESCRIPTION

Figure 1:
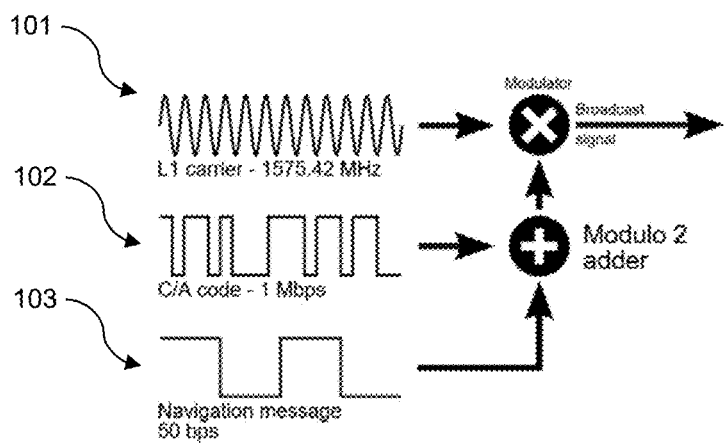
FIG. 1 illustrates the basic concept of modulating various signals into a composite broadcast signal.

While this disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

FIG. 1 illustrates the basic concept of modulating various signals into a composite broadcast signal. The navigation message code 103 is modulated into the C/A code 102 as further explained in reference to FIG. 6 below. The resulting modulated code is then modulated into the carrier signal 101. Notably, this exemplary embodiment is specific to the L1 carrier signal of a GPS system but the concepts may be similarly applied to any broadcast positioning system such as L5 GPS, other GNSS systems, or LORAN.

As mentioned above, a standard GPS navigation message is composed of twenty-five pages. Each page is composed of five subframes; each subframe is comprised of ten words; and each word contains twenty-four data bits together with six parity bits (i.e. thirty bits/word). Some of the information in a navigation message changes frequently and is unpredictable, some changes rarely and can be predictable for a period of time, some can be calculated based upon a known value at a previous point in time and a length of time since elapsed, and some essentially never changes and is predictable. In this regard, by knowing which bits of a navigation message correspond to the various pieces of information contained in navigation messages, one can determine whether or not a bit is predictable, predictable until a given time, or unpredictable.

Subframes 1, 2, and 3 of each page of a navigation message comprise ephemeris data (fifteen parameters which describe the orbit of an individual satellite plus the clock correction polynomial). These parameters are typically uploaded by the control segment every two hours. In other words, the bits associated with these subframes may be entirely predictable for up to two hours following the most recent update. Following an update, only a portion of these subframes remains predictable, as discussed below.

Subframes 4 and 5 of each page comprise almanac data, together with a few other slowly changing (e.g., predictable) data fields. Typically, Subframes 4 & 5 are uploaded daily which means, the data contained therein may be reliably predicted until the next scheduled upload (up to twenty-four hours).

Figure 2:
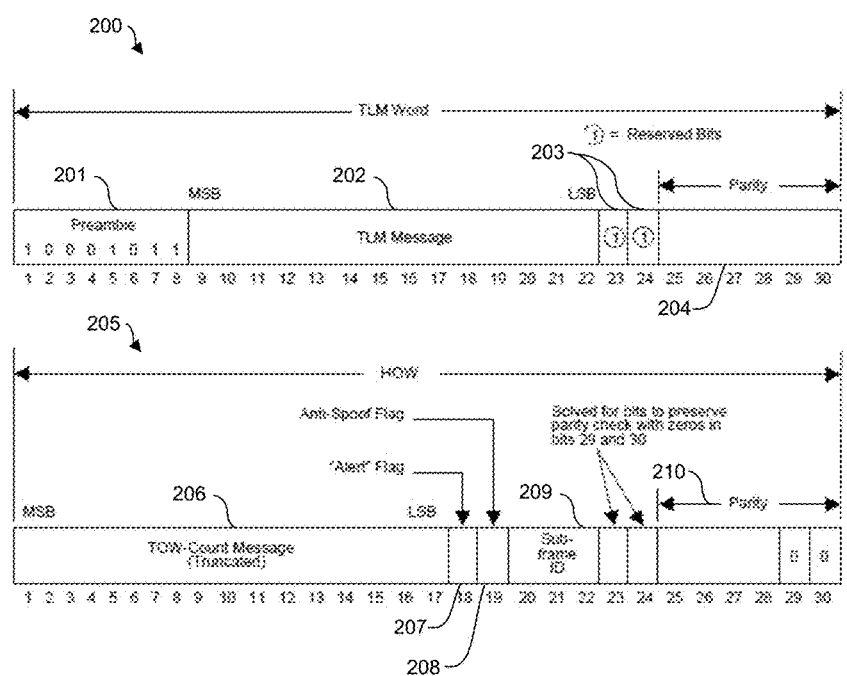
FIG. 2 is a visual depiction of the architecture of the TLM and HOW of each subframe.

All subframes start with a Telemetry word (TLM) 200 in the Word 1 position followed by a Handover word (HOW) 205 in the Word 2 position. As shown in FIG. 2 reproduced from ICD-GPS-200C, which is herein incorporated by reference in its entirety, the TLM includes a static preamble (8 bits) 201, fourteen data bits of a TLM message 202 which rarely change, two reserved bits (Bits 23 & 24) 203 which also rarely change, and six parity bits 204. The HOW 205 begins with seventeen bits dedicated to conveying the current truncated Time of Week (TOW) 206 which may be multiplied by 1.5 to calculate the full TOW. Bit 18 of the HOW is an 'Alert' flag 207, which may be used to indicate that the satellite may be transmitting unreliable data, and Bit 19 is an 'Anti-spoof' flag 208. Both of these bits rarely change. Bits 20, 21, and 22 are used indicate the current subframe (i.e., 1-5) as a subframe ID 209, and are therefore entirely predictable given an accurate time. Further, Bits 29 and 30 of parity bits 210 are both zero and Bits 23 and 24 are calculated to preserve the effectiveness of a parity check while allowing Bits 29 and 30 to be zero.

The value, D, of a word's 24 data bearing bits may be calculated as:

$$D_i = d_i \oplus D_{30}^* \, i=1, \ldots, 24,$$

where $D_{30}^*$ is the value of the previous word's $30^{th}$ parity bit ($\oplus$ denotes modulo 2 addition). The value of the last two parity bits of a word may be calculated as:

$$D_{29} = D_{30}^* \oplus d_1 \oplus d_3 \oplus d_5 \oplus d_7 \oplus d_9 \oplus d_{10} \oplus d_{14} \oplus d_{15} \oplus d_{16} \oplus d_{17} \oplus d_{18} \oplus d_{21} \oplus d_{22} \oplus d_{24},$$

and $$D_{30} = D_{29}^* \oplus d_3 \oplus d_5 \oplus d_6 \oplus d_8 \oplus d_9 \oplus d_{10} \oplus d_{11} \oplus d_{13} \oplus d_{15} \oplus d_{19} \oplus d_{22} \oplus d_{23} \oplus d_{24},$$

where $D_{29}^*$ is the $29^{th}$ parity bit from the previous word.

Therefore, given that Bits 23 & 24 of the TLM word 200, and the Alert 207 and Anti-spoof 208 flags in the HOW 205 do not change, given a reliably accurate time, all bits in the first two words are entirely predictable regardless of whether or not the ephemeris or almanac data that follows the two words has changed. Specifically, assuming prior receipt of a navigation message either from a previous PNT signal or from a network connection, and assuming no new data has been uploaded by the control segment, it is possible to predict the HOW words for each of the subframes in all the twenty-five pages and re-compute all the parity bits with no errors. This could be the case for up to two hours, at which point a new ephemeris upload would likely occur. Further, even assuming a new upload of ephemeris (but not almanac) had occurred, it would still be possible to predict all the data bits in Subframes 4-5, and the TLM word and HOW in Subframes 1-3 for a period of up to a day, given accurate time. In this scenario, it would be possible to predict Words 1 & 2 (out of 10) for Subframes 1-3 as well as all ten words of Subframes 4-5. Therefore, a receiver may predict a fraction of a navigation message equal to:

((2 words/10 words*3 subframes)+2 subframes)/5 subframes=0.52.

This percentage of the navigation message being predictable would lead to a SNR degradation of:

10 $Log_{10}(0.52) \approx -2.84$ dB.

At a point in time at which both ephemeris and almanac data have been updated since the most recent assistance data was received, the fraction of predictable bits would drop to:

(2 words/10 words*5 subframes)/5 subframes=0.2, with a corresponding SNR degradation of:

10 $Log_{10}(0.2) \approx -6.99$ dB.

Figure 3:
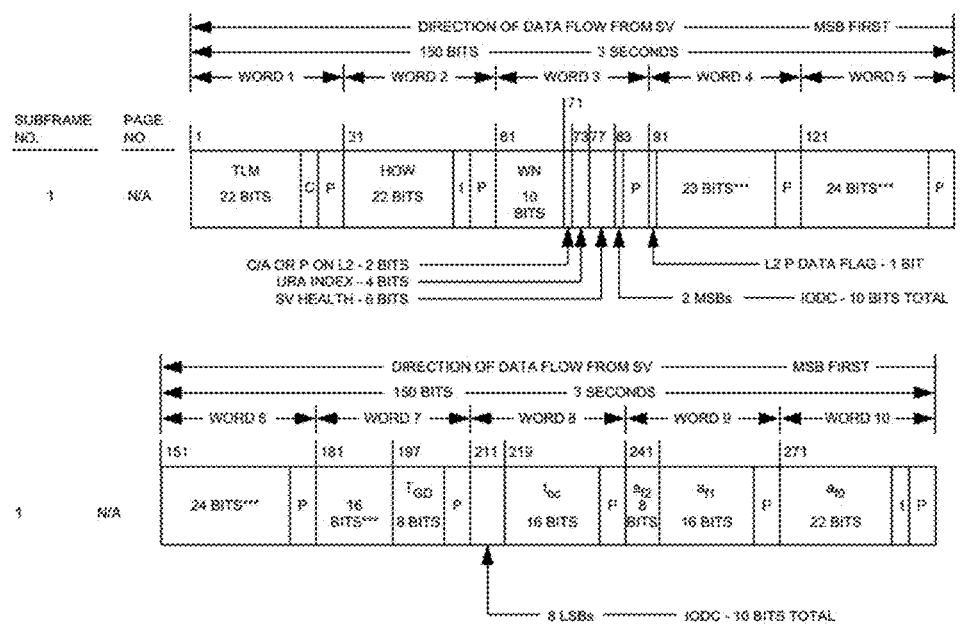
FIGS. 3-5 are visual depictions of the architecture of Subframes 1-3.
Figure 4:
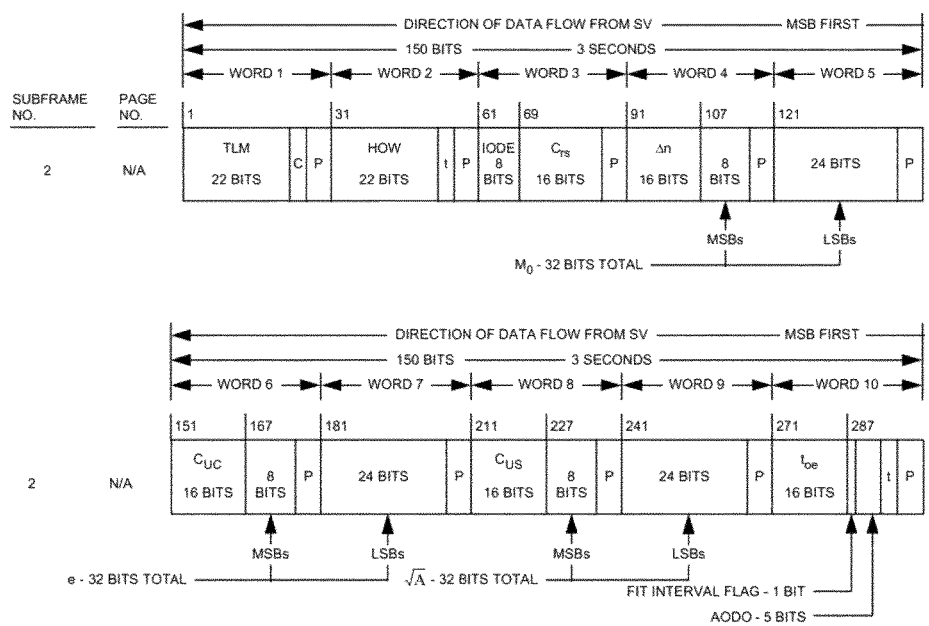
Figure 5:
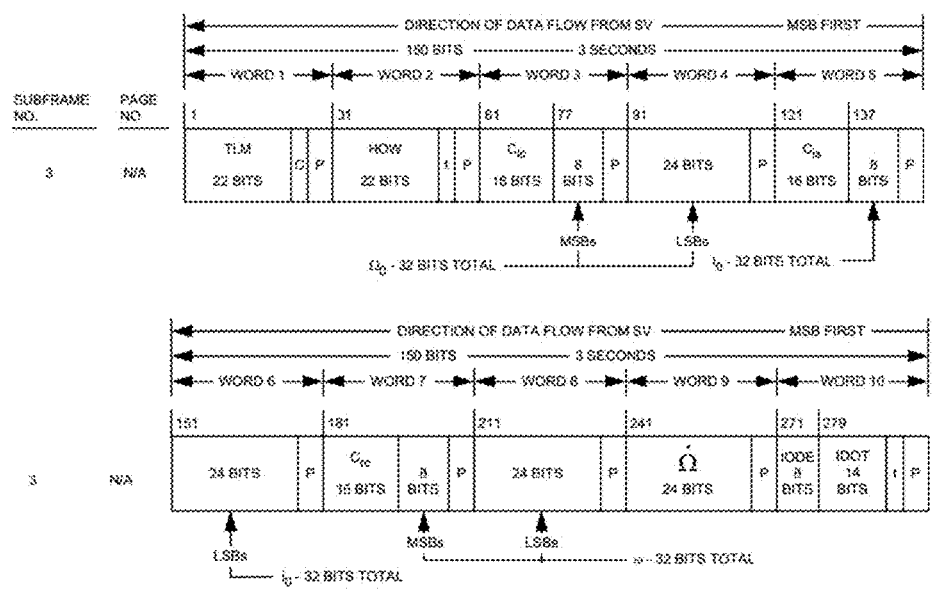

FIGS. 3-5 are visual depictions of the architecture and contents of Subframes 1-3. Subframes 4-5 have been omitted as they are generally more complex and change frequently from one page to the next. For more detailed information with regard to the contents of the subframes, please see ICD-GPS-200C or subsequent interface control documents released by the U.S. government. It should be appreciated that despite Subframes 4-5 being complex and their contents changing frequently, the values of the data bits in these subframes may be reliably predicted given accurate time.

Subframes 1-3 include ephemeris and clock parameters for the transmitting SV while Subframes 4-5 contain almanac data as well as ionospheric and tropospheric parameters. The ephemeris parameters typically consist of:

six Keplerian elements:
$M_0$ (mean anomaly);
$\Omega_0$ (argument of the line of ascending nodes);
$I_0$ (nominal inclination of the orbit to the equatorial plane);
$\omega$ (argument of the periapsis);
$\sqrt{A}$ (square root of the semi major axis);
e (eccentricity of the orbit);
three rates:
$\dot{I}$ (rate of change of the inclination);
$\dot{\Omega}$ (precession of the line of ascending nodes);
$\Delta n$ (the correction to the mean motion);
and six sinusoidal perturbation elements:
$C_{is}, C_{ic}, C_{rs}, C_{rc}, C_{us}, C_{uc},$
which are perturbations to the inclination, the semi-major axis and the argument of the latitude (respectively).

The clock parameters are $a_{f0}, a_{f1}, a_{f2}$ (offset, rate, and, drift rate respectively). Additional time parameters include $t_{OE}$ (time of ephemeris), toc (time of clock), and week number (WN), all of which (similar to the HOW) can be calculated from previously received assistance data. Moreover, the $T_{GD}$ (theoretic group delay) will not change between ephemeris uploads whose 'ID' is captured in the IODE (issue of data ephemeris). There are also 'reserved data bits' which seldom change between IODEs.

Figure 6:
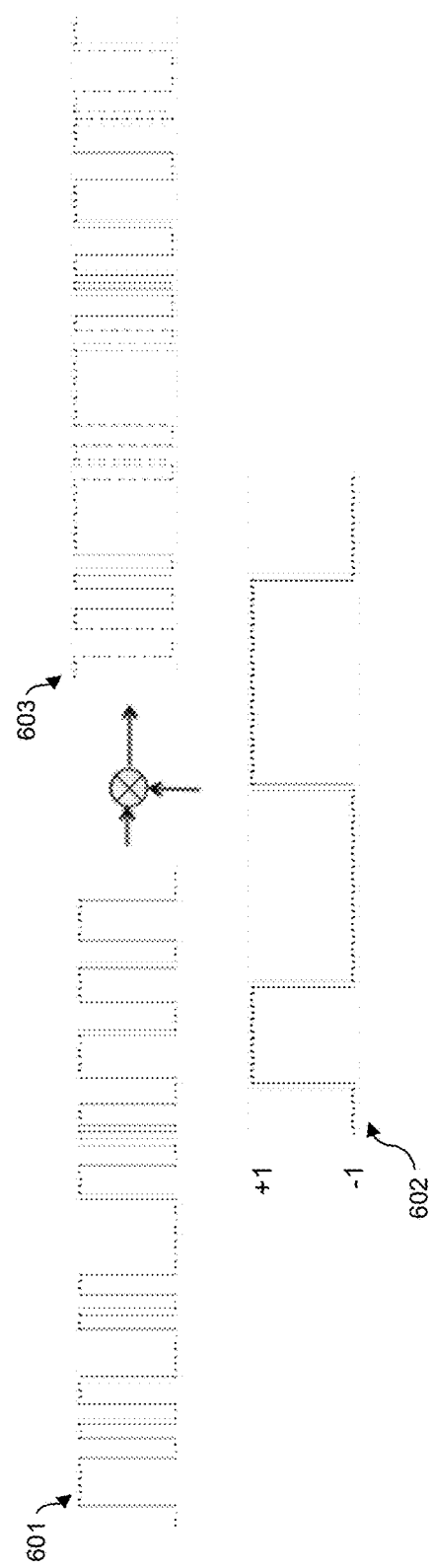
FIG. 6 illustrates the modulation of navigation message data with an SV's C/A signal.

FIG. 6 illustrates the modulation of navigation message 602 data bits with an SV's C/A code 601. This process may occur at the SV prior to modulation with and transmission of the carrier signal and/or may occur at the receiver in the generation of a replica signal. The C/A code signal 601 is illustrated as a series of chips having positive or negative polarities with vertical transitions therebetween. The navigation message code 602 is similarly illustrated but with longer intervals between transitions representing the lower frequency of the navigation message code 602 with respect to the C/A code signal 601. The navigation message code 602 may be modulated into the C/A code signal 601 by flipping the polarity of each chip of the C/A code corresponding to a negative polarity of the navigation message code 602. In this regard, a positive chip of the C/A code signal 601 modulated with a negative polarity of the navigation message code 602 will be flipped to become negative and a positive chip of the C/A code signal 601 modulated with a positive polarity of the navigation message code 602 will remain positive. In this regard, the portions of modulated signal 603 illustrated with solid lines are identical to the respective portions of the C/A code signal 601 because they are modulated with positive polarities of the navigation message code 602. In contrast, the portions of modulated signal 603 illustrated with dashed lines are flipped (i.e., inverse) as compared to the respective portions of the C/A code signal 601 because they are modulated with negative polarities of the navigation message code 602.

Figure 7:
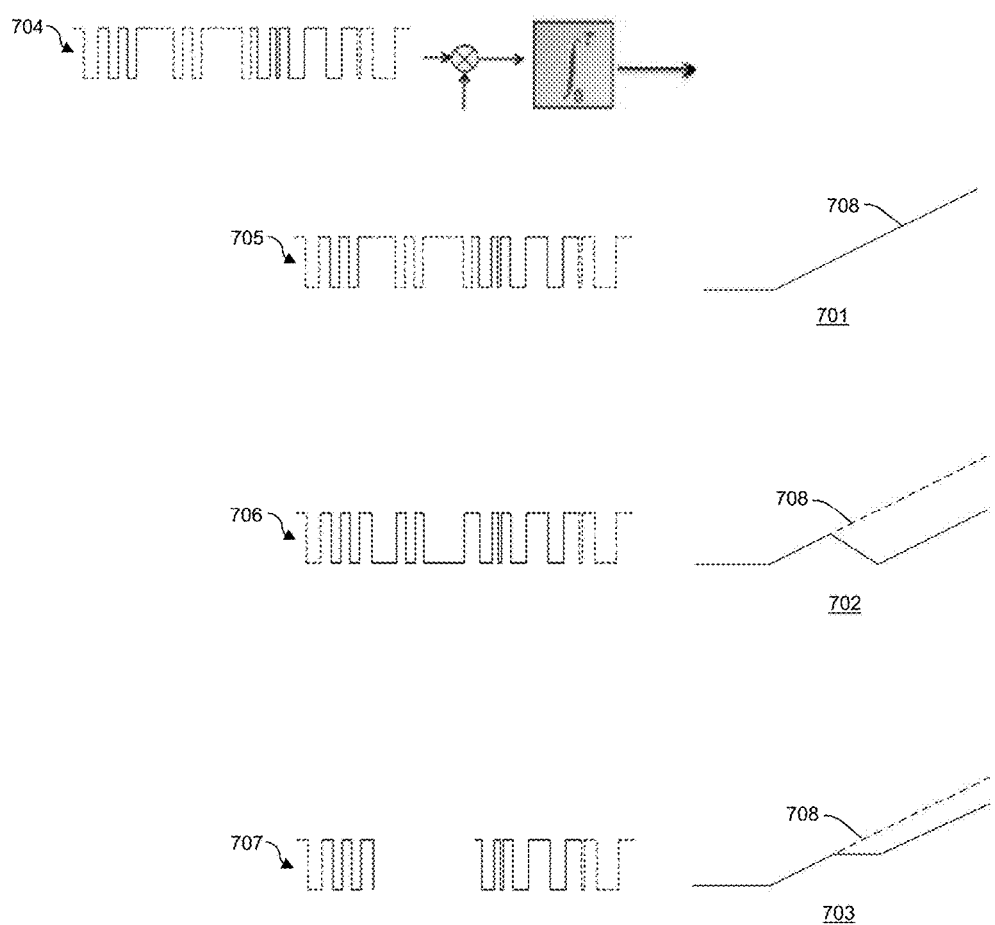
FIG. 7 illustrates three examples of replica signals and the resulting signal degradation graphs.

As mentioned above, each navigation message data bit of 20 ms modulates twenty 1 ms epochs of C/A code. If a data bit value is unknown and unpredictable, a receiver may assume that out of all of the C/A chip values, 50% will have the correct polarity and 50% will not. If a receiver were to integrate these unknown data bits, this integration will reduce the SNR of the signal by virtue of the bits of C/A code having an incorrect polarity due to the unknown and unpredictable navigation bits. However, in accordance with an aspect of the present invention, if a receiver simply temporarily stops the integration of the C/A code and instead bridges over the unknown data bits, then the correlation may be maintained accurately and a degree of degradation may be avoided as illustrated by the three examples of replica signals shown in FIG. 7. Graph 701 illustrates the correlation that would result from integration of an exact replica 705 of the SV signal with the SV signal 704. In other words, a receiver which knows every bit of the navigation message signal can construct an exact replica signal 705 yielding an ideal signal to noise ratio line 708 which steadily climbs over time. However, in the absence of assistance data being received at a receiver, it is unlikely that the receiver will be able to construct an exact replica signal 705. Typically, without assistance data, a receiver will construct an errant replica 706 with some incorrect data bits which will lead to an SNR resembling graph 702. In this example, the incorrectly guessed or assumed unpredictable data bits will cause degradation. This is illustrated by a decrease in SNR corresponding to the incorrect data bits, which will result in a substantial departure from the ideal SNR line 708. In contrast, and in accordance with an aspect of the present invention, graph 703 illustrates that bridging over (i.e., disregarding) unpredictable bits in a replica signal 707 during integration will yield a correlation solution which is less than the ideal SNR line 708 (i.e., exact replica) but an improvement upon the traditional approach 702.

Figure 8:
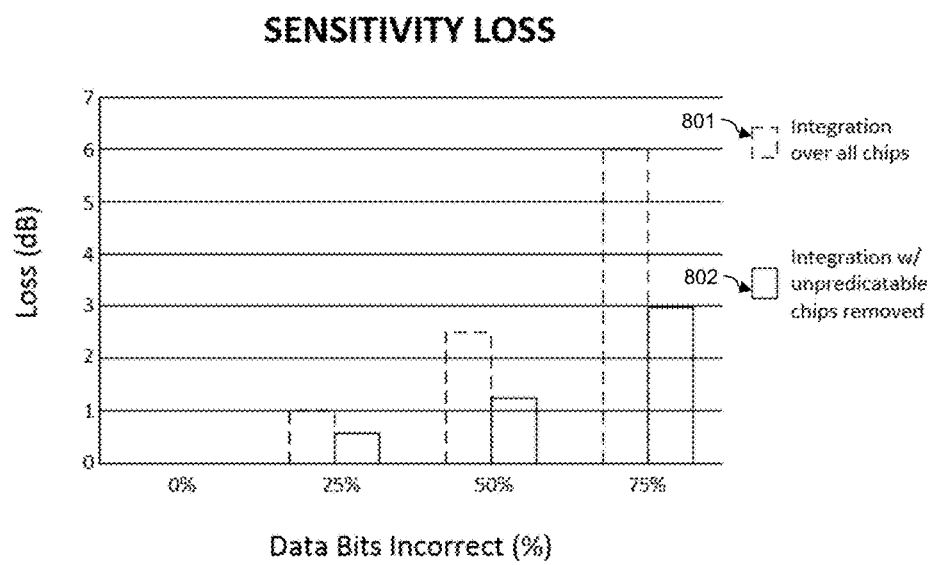
FIG. 8 graphically depicts empirical results of a test simulation.

FIG. 8 graphically depicts empirical results of a test simulation that compared the two above-discussed methods (i.e., integrating with incorrect C/A chip values versus integrating without chip values corresponding to unpredictable navigation bits) to determine whether or not it is beneficial to bridge the unpredictable navigation bits instead of including them in integration. The simulation tested scenarios in which 0%, 25%, 50% and 100% of the data bits were flipped in relation to the previously "received" assistance data. The reference point for the simulation was the sensitivity of a receiver when no data bits were flipped and the integration period was 1 second (in other words, essentially perfect integration of 1,000 epochs). Notably, the method utilized is practicable to any integration period, for example, that is a multiple of 20 ms. As shown in FIG. 8, the simulation indicates that in each scenario the sensitivity lost through coherent integration is less when the receiver simply avoids or bridges across the unknown data bits 802 rather than performing an integration which includes them 801.

Figure 9:
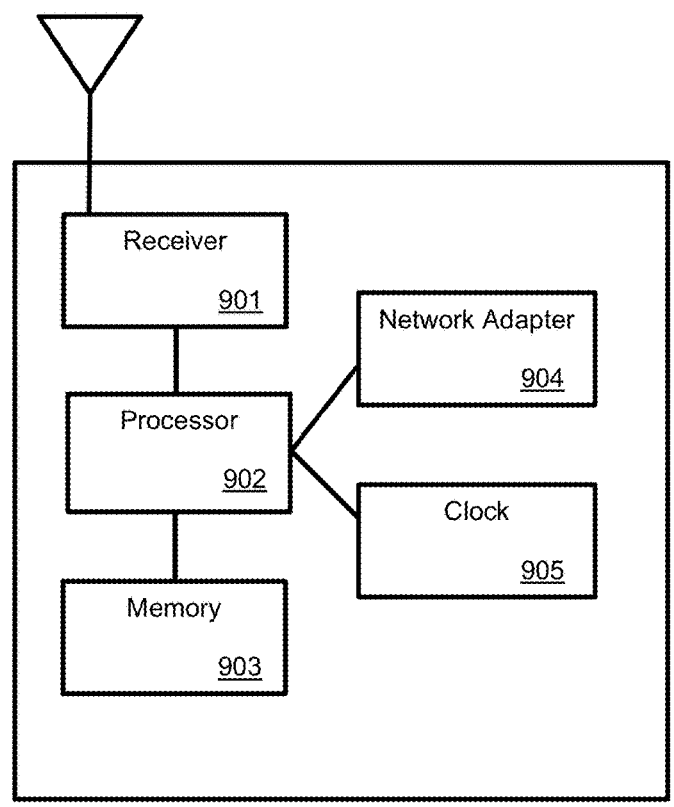
FIG. 9 illustrates a block diagram of an apparatus for receiving and processing signals according to the present disclosure.

FIG. 9 depicts an exemplary embodiment of an apparatus 900 in accordance with the present disclosure. The apparatus may include a network adapter 904, a receiver 901, a processor 902, a clock 905, and memory 903. The processor 902 and memory 903 may operate in a coordinated fashion to execute the functions described herein associated with a bit predictor and an integration module. The network adapter 904 may provide the apparatus with access to assistance data via any appropriate network connection.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only a preferred embodiment and variants thereof have been shown and described and that all changes and modifications that come within the spirit of the disclosure are desired to be protected.

What is claimed is:

1. A method for continued tracking of a broadcast positioning system signal upon loss of connectivity to assistance data regarding the broadcast positioning system signal, comprising:

determining a loss of connectivity, via a network connection, to assistance data regarding a broadcast positioning system signal at a receiver;

receiving, at an antenna associated with the receiver, the broadcast positioning system signal comprising encoded data bits which originates from a global navigation by satellite system and comprises a coarse acquisition code and a navigation message code comprising a plurality of navigation messages, wherein the assistance data comprises a plurality of duplicate navigation messages, each duplicate navigation message simulating a corresponding navigation message of the navigation message code, the encoded data bits comprising predictable bits and unpredictable bits, wherein the encoded data bits are predictable or unpredictable based upon a structure of the encoded data bits defined in positioning system signal information stored in a memory in operative communication with the receiver and available in the absence of connectivity to the assistance data, wherein the structure of the encoded data bits comprises an architecture common to each navigation message, the architecture including a plurality of pages, each page comprising a plurality of subframes, each subframe comprising a plurality of words, and each word comprising a plurality of data bits, wherein values of predictable bits are predictable based upon positions of the predictable bits within the architecture; and integrating, with an integration module, the encoded data bits over an integration period, wherein the unpredictable bits of the encoded data bits are not summed in the integrating and the predictable bits of the encoded data bits are summed in the integrating.

2. The method of claim 1, wherein the predictable bits comprise a telemetry word and a handover word of the navigation message code.

3. The method of claim 2, wherein the predictable bits further comprise at least one of almanac information and ephemeris information pertaining to satellite vehicles.

4. The method of claim 3, wherein the unpredictable bits comprise ephemeris information updated by a control segment to at least one satellite vehicle of the global navigation by satellite system subsequent to receipt of assistance data comprising a first duplicate navigation message at the receiver via a data network connection, the first duplicate navigation message identifying values of data bits in a first navigation message of the broadcast positioning system signal.

5. The method of claim 4, wherein the positioning system signal information comprises the first duplicate navigation message received at the receiver prior to the loss of connectivity to the assistance data.

6. The method of claim 5, wherein:
the coarse acquisition code comprises a first encoded data rate corresponding to a first bit length and the navigation message code comprises a second encoded data rate corresponding to a second bit length, wherein the first encoded data rate is higher than the second encoded data rate such that the first bit length is shorter than the second bit length, and the navigation message code modulates the coarse acquisition code;
a duration of the integration period is greater than the second bit length; and
the unpredictable bits comprise known bit values of the coarse acquisition code modulated by unknown bits of the navigation message code, and the predictable bits comprise known bit values of the coarse acquisition code modulated by known bits of the navigation message code.

7. The method of claim 6, further comprising:
predicting values of data bits to be received in a second navigation message subsequent to the loss of connectivity to the assistance data, the predicting based at least in part on the first duplicate navigation message;
demodulating, at the receiver, first portions of the second navigation message comprising the predictable bits;
coherently integrating the first portions; and
placing the receiver into a holdover mode during at least one of receipt and processing of second portions of the second navigation message comprising the unpredictable bits.

8. The method of claim 7, wherein the holdover mode comprises maintaining a time according to a local clock at the receiver utilizing an oscillator associated with the local clock without electrically steering a frequency of the oscillator.

9. The method of claim 7, wherein the predicting comprises:
extracting, from the first duplicate navigation message, known values of data bits which are expected to remain unchanged in subsequent navigation messages including at least the second navigation message;
extracting, from the first duplicate navigation message, known values of data bits which are expected to change in accordance with absolute time such that corresponding data bits in the second navigation message are predictable based upon time and the known values of the data bits of the first duplicate navigation message; and predicting a value of at least one data bit to be received from the global navigation by satellite system in the second navigation message based upon a known time and a value of a corresponding data bit observed in the first duplicate navigation message.

10. An apparatus for continued tracking of a broadcast positioning system signal upon loss of connectivity to assistance data regarding the broadcast positioning system signal, comprising:

a network adapter providing the apparatus with access to assistance data available via a network connection;

a receiver operative to receive a broadcast positioning system signal comprising encoded data bits, the encoded data bits comprising predictable bits and unpredictable bits, wherein the broadcast positioning system signal originates from a global navigation by satellite system and comprises a coarse acquisition code and a navigation message code comprising a plurality of navigation messages, wherein the assistance data comprises a plurality of duplicate navigation messages, each duplicate navigation message simulating a corresponding navigation message of the navigation message code;

a bit predictor operative to determine which of the encoded data bits are predictable based upon a structure of the encoded data bits defined in positioning system signal information available in the absence of connectivity to the assistance data and predict a phase of each of the predictable bits, wherein the structure of the encoded data bits comprises an architecture common to each navigation message, the architecture including a plurality of pages, each page comprising a plurality of subframes, each subframe comprising a plurality of words, and each word comprising a plurality of data bits, wherein values of the predictable bits are predictable based upon positions of the predictable bits within the architecture; and an integration module operative to integrate the encoded data bits over an integration period, wherein the unpredictable bits of the encoded data bits are not summed and the predictable bits of the encoded data bits are summed.

11. The apparatus of claim 10, wherein the predictable bits comprise a telemetry word and a handover word of the navigation message code, and wherein the predictable bits further comprise at least one of almanac information and ephemeris information pertaining to satellite vehicles.

12. The apparatus of claim 11, wherein the unpredictable bits comprise ephemeris information updated by a control segment to at least one satellite vehicle of the global navigation by satellite system subsequent to receipt of assistance data comprising a first duplicate navigation message at the receiver via a data network connection, the first duplicate navigation message identifying values of data bits in a first navigation message of the broadcast positioning system signal, wherein the positioning system signal information comprises the first duplicate navigation message received at the receiver prior to the loss of connectivity to the assistance data.

13. The apparatus of claim 12, wherein:

the coarse acquisition code comprises a first encoded data rate corresponding to a first bit length and the navigation message code comprises a second encoded data rate corresponding to a second bit length, wherein the first encoded data rate is higher than the second encoded data rate such that the first bit length is shorter than the second bit length, and the navigation message code modulates the coarse acquisition code;

a duration of the integration period is greater than the second bit length;

the unpredictable bits comprise known bit values of the coarse acquisition code modulated by unknown bits of the navigation message code, and the predictable bits comprise known bit values of the coarse acquisition code modulated by known bits of the navigation message code;

wherein the bit predictor is operative to predict values of data bits to be received in a second navigation message subsequent to the loss of connectivity to the assistance data based at least in part on the first duplicate navigation message; and the receiver is further operative to:
demodulate first portions of the second navigation message comprising the predictable bits;
coherently integrate the first portions; and
initiate a holdover mode during at least one of receipt and processing of second portions of the second navigation message comprising the unpredictable bits.

14. The apparatus of claim 13, further comprising:
a local clock, wherein the holdover mode comprises maintaining a time according to the local clock utilizing an oscillator associated with the local clock without electrically steering a frequency of the oscillator.

15. The apparatus of claim 13, wherein the bit predictor is operative to:

extract, from the first duplicate navigation message, known values of data bits which are expected to remain unchanged in subsequent navigation messages including at least the second navigation message;

extract, from the first duplicate navigation message, known values of data bits which are expected to change in accordance with absolute time such that corresponding data bits in the second navigation message are predictable based upon time and the known values of the data bits of the first duplicate navigation message; and predict a value of at least one data bit to be received from the global navigation by satellite system in the second navigation message based upon a known time and a value of a corresponding data bit observed in the first duplicate navigation message.

* * * * *